(12) United States Patent
Kim et al.

(10) Patent No.: US 8,509,258 B2
(45) Date of Patent: Aug. 13, 2013

(54) METHOD AND APPARATUS FOR IMPROVED DATA CHANNEL TRANSMISSION IN A DIGITAL NETWORK

(75) Inventors: Seong-Hwan Kim, Macungie, PA (US); James M. Sepko, Coplay, PA (US); Sundar Vedantham, Orwigsburg, PA (US)

(73) Assignee: Agere Systems LLC, Allentown, PA (US)

( * ) Notice: Subject to any disclaimer, the term of this patent is extended or adjusted under 35 U.S.C. 154(b) by 1876 days.

(21) Appl. No.: 10/999,703

(22) Filed: Nov. 30, 2004

(65) Prior Publication Data

US 2006/0114922 A1    Jun. 1, 2006

(51) Int. Cl.
*H04J 3/26*    (2006.01)

(52) U.S. Cl.
USPC ............................. 370/432; 370/352; 370/468

(58) Field of Classification Search
USPC ................. 370/352–355, 432, 468, 480, 485; 375/222, 229; 709/219, 225
See application file for complete search history.

(56) References Cited

U.S. PATENT DOCUMENTS

| | | | | |
|---|---|---|---|---|
| 6,763,019 B2 * | 7/2004 | Mehta et al. | ................... | 370/352 |
| 6,977,922 B2 * | 12/2005 | Blanset et al. | ................ | 370/352 |
| 7,206,850 B2 * | 4/2007 | Ogawa | ........................... | 709/229 |
| 7,272,652 B1 * | 9/2007 | Keller-Tuberg | ................ | 709/227 |
| 7,289,488 B2 * | 10/2007 | Qu | .................................. | 370/352 |
| 7,301,936 B2 * | 11/2007 | Wan et al. | ...................... | 370/352 |
| 7,406,085 B2 * | 7/2008 | Hadjiahmad et al. | ..... | 370/395.54 |
| 7,409,053 B1 * | 8/2008 | Kennedy et al. | ......... | 379/221.01 |
| 8,150,993 B2 * | 4/2012 | Glasser et al. | ................ | 709/231 |
| 8,166,499 B2 * | 4/2012 | Stone et al. | ..................... | 725/31 |
| 2004/0088735 A1 * | 5/2004 | Kristofek | ....................... | 725/118 |

OTHER PUBLICATIONS

1. Tut Systems, Inc., "VideoTele.com Debuts Astria™ Video Services Switch for Delivering Digital TV Over Existing xDSL Networks," Press Release, 2 pages, May 28, 2003.
Paradyne Networks, Inc., "Paradyne Networks and VideoTele.com Announce Video Alliance," Press Release, 2 pages, Jun. 4, 2003.

\* cited by examiner

*Primary Examiner* — Marcus R Smith
*Assistant Examiner* — Mark A Mais
(74) *Attorney, Agent, or Firm* — Ryan, Mason & Lewis, LLP (57) ABSTRACT

A integrated circuit device for use in a line card of a digital networking system is capable of intercepting one or more control messages corresponding to a requested data channel sent from at least one customer premises equipment (CPE) device. The integrated circuit device is also capable of receiving a plurality of data channels from a data server of the digital networking system and providing the one or more requested data channels to the at least one CPE device, thereby providing faster data channel selecting and switching capabilities.

24 Claims, 6 Drawing Sheets

| PORT | EN0 | CHANNEL0 | EN1 | CHANNEL1 | EN2 | CHANNEL2 | EN3 | CHANNEL3 |
|---|---|---|---|---|---|---|---|---|
| 0 | 1 | 11 | 1 | 11 | 1 | 3 | 1 | 10 |
| 1 | 0 | - | 0 | - | 0 | | 0 | - |
| 2 | 1 | 1 | 1 | 2 | 1 | 4 | 1 | 14 |
| 3 | 1 | 2 | 1 | 3 | 1 | 5 | 1 | 100 |
| 4 | 1 | 3 | 1 | 4 | 1 | 6 | 1 | 10 |
| ... | | | | | | | | |
| ... | 1 | 4 | 1 | 1 | 1 | 7 | 1 | 14 |
| 123 | 0 | - | 0 | - | 0 | - | 0 | - |

METHOD AND APPARATUS FOR IMPROVED DATA CHANNEL TRANSMISSION IN A DIGITAL NETWORK

FIELD OF THE INVENTION

The present invention relates generally to the field of digital networking systems and, more particularly, to improved techniques for providing data channels to end users in a digital network.

BACKGROUND OF THE INVENTION

Traditional data channel transmission techniques include for example, data channel multicasting, which may be employed in a digital subscriber line access multiplexer (DSLAM) network. A DSLAM network provides an end user, at a terminal or other endpoint, with the ability to switch between streams of data, or data channels, received from an upstream source. A DSLAM network is typically designed to accommodate a variety of different types of data channels, such as, for example, a number of video channels as well as channels associated with user data, voice and gaming traffic. The endpoints of a DSLAM platform are customer premises equipment (CPE) devices, which are commonly accessed by the network through modems at a residence or business. CPE devices may include, for example, televisions, computers, personal digital assistants (PDAs), telephones or other types of communication terminals. A DSLAM network enables the delivery of any of the available channels to an end user while simultaneously allowing the end user to use the data, voice and gaming channels.

An end user may select one data channel from a set of channels that are broadcasting at a given time. An Internet group multicast protocol (IGMP) signal has traditionally been used to effect this channel selection by sending an IGMP control message from the CPE device of the end user through the DSLAM network and to a broadband remote access server (B-RAS). The channel selection is conveyed upstream in order to effect the switch to a newly selected channel. Since the signal has to travel from the CPE device, and through the network to the B-RAS, the time required to effect the channel change is usually fairly long. In DSLAM applications utilizing a central office (CO), the CO in the network polls for IGMP control messages. A CO may support a large number of CPEs, thus, IGMP consolidation presents a significant challenge to the efficiency of the system.

Attempts to solve the problems of channel switching time and IGMP control message consolidation have resulted in the use of software controlled selective channel switching in an uplink card of the CO. In such attempts, channel switching time is reduced by receiving at the uplink card, those video channels considered popular, thereby anticipating end user requests. The channel switching speed between channels in this subset of popular channels is increased. However, the time required to join, or to switch to, channels that are not considered popular and have not been received at the uplink card, will remain fairly long. This is due to the fact that the IGMP control message for the unpopular channel travels back to the B-RAS so that the channel may be transmitted to and received at the uplink card of the CO.

These attempts also result in an additional delay within the CO. A line card in the CO sends the control message to the uplink card, which processes the control message. A delay occurs in this transmission due to the fact that a more complex switching is required in the CO instead of a simple broadcast of the data channels from the upstream equipment. Finally, IGMP control messages are also periodically generated from the CPE devices to ensure connectivity within the network. This connectivity check has the ability to flood the network with control messages.

Thus, a need remains for a technique that enables faster selection and switching of channels of a digital networking system, as well as a technique for decreasing the number of control messages sent over the network.

SUMMARY OF THE INVENTION

The present invention in an illustrative embodiment provides a digital networking system that transmits data channels to end users through an effective data channel selection and switching technique.

In accordance with one aspect of the invention, an integrated circuit device for use in a line card of a digital networking system is capable of intercepting one or more control messages from at least one CPE device corresponding to one or more requested data channels. The integrated circuit device is also capable of receiving a plurality of data channels from a data server of the digital networking system and providing the one or more requested data channels to the at least one CPE device.

An apparatus in accordance with this aspect of the present invention, used in a network node of digital networking system, comprises at least one line card. The line card comprises an integrated circuit device that is capable of intercepting one or more control messages from at least one CPE device corresponding to one or more requested data channels. The integrated circuit device is also capable of receiving the plurality of data channels from the data server of the digital networking system and providing the one or more requested channels to the CPE device.

A method of providing a data channel to a CPE device in a digital networking system in accordance with this aspect of the present invention comprises the receiving of a plurality of data channels at each of one or more line cards from a data server of the digital networking system. One or more control messages are intercepted, each corresponding to a requested data channel from the CPE device, at one or more line cards. The one or more requested data channels are provided to the at least one CPE device from the line card through a integrated circuit device of the line card.

Advantageously, an illustrative embodiment of the present invention ensures faster channel selection and switching. Each data channel is fed to the DSLAM central office and to the individual line cards, so that the channel switching time delay will be identical for all available data channels. The embodiments of the present invention may take advantage of large capacity backplane devices and an access network. By intercepting the control message at the line card, this architecture eliminates communication delay between the CO and the far-end data server, B-RAS. The processing delay involved in effecting the channel switchover is also reduced. Finally, the embodiments of the present invention prevent control messages from flooding the network.

These and other objects, features, and advantages of the present invention will become apparent from the following detailed description of the illustrative embodiments thereof, which is to be read in connection with the accompanying drawings.

DETAILED DESCRIPTION

As will be described in detail below, the present invention in the illustrative embodiment relates generally to the field of digital networking systems and, more particularly, to improved techniques for providing data channels to end users in a digital network.

Figure 1:
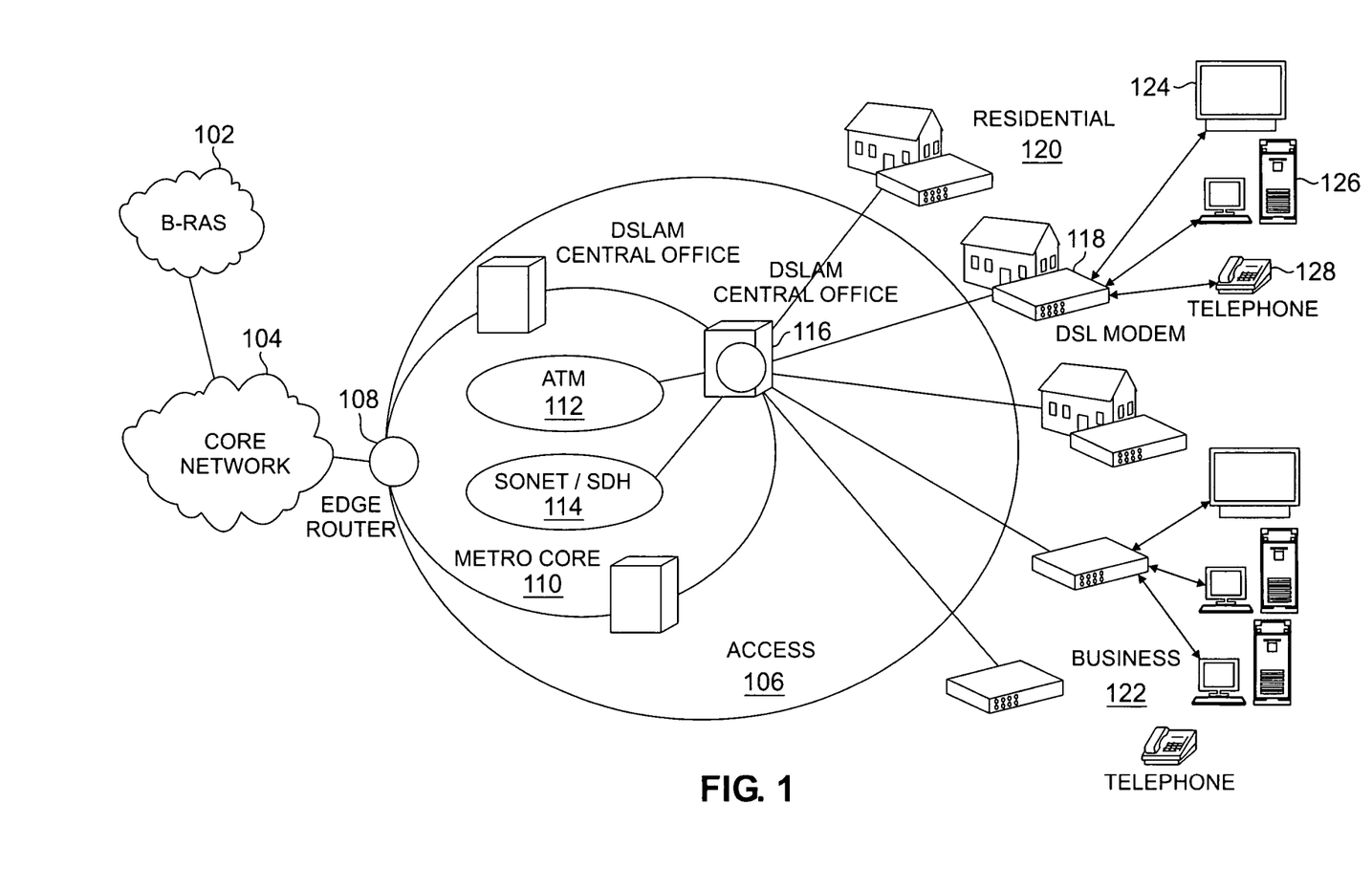
FIG. 1 is a diagram illustrating a DSLAM network, according to an embodiment of the present invention.

Referring initially to FIG. 1, a diagram illustrates a DSLAM network, according to an embodiment of the present invention. A plurality of data channels, for example, video channels, are sent from the far end of the network at B-RAS 102, through a core network 104 and into an access network 106. Core network 104 is in communication with access network 106 through an edge router 108. Edge router 108 may communicate with a network node, or more specifically, CO 116, through a metro core 110 of access network 106 via an asynchronous transfer mode (ATM) 112, synchronous optical network (SONET) or synchronous digital hierarchy (SDH) 114. SONET is the United States version of synchronous data transmission over fiber optic networks, while SDH is the international version of the standard. Edge router 108 may provide communication to and from several DSLAM central offices through metro core 110 of access network 106. DSLAM central office 116 is in communication with DSL modems 118 at residences 120 and businesses 122 for use, for example, with a television 124, computer 126, or telephone 128.

Through the DSLAM network provided in FIG. 1, the plurality of data channels may be transmitted to CO 116 for individual distribution to CPE devices 124, 126 and 128, through DSL modems 118, in response to control messages sent from CPE devices 124, 126 and 128, to B-RAS 102, and intercepted by CO 116.

Figure 2:
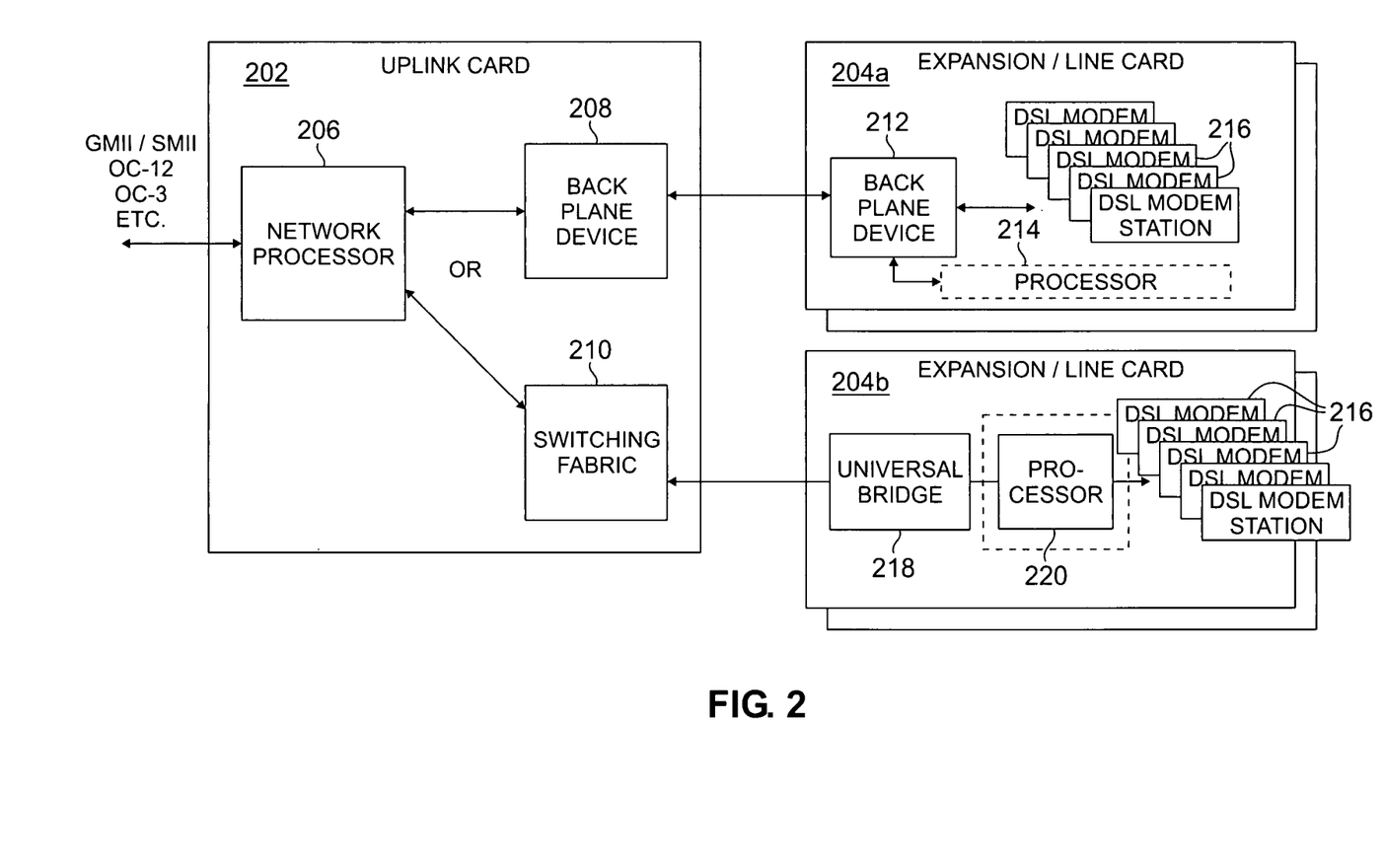
FIG. 2 is a diagram illustrating a general DSLAM central office architecture, according to an embodiment of the present invention.

Referring now to FIG. 2, a diagram illustrates a general DSLAM central office architecture, according to an embodiment of the present invention. This may be considered a more detailed view of DSLAM central office 116 of FIG. 1. An uplink card 202 communicates with at least one line card 204a, 204b. In this embodiment, uplink card 202 provides communication with upstream components of the DSLAM network through, for example, gigabit media independent interface (GMII) or serial media independent interface (SMII), through, for example, optical carrier 12 (OC-12, 622.08 Mbps) or optical carrier 3 (OC-3, 155.52 Mbps), at ATM or multi-protocol network processor 206.

Network processor 206 may communicate with a backplane device 208 or a switching fabric 210 within uplink card 202. Uplink card 202 having backplane device 208, and uplink card 202 having switching fabric 210, represent two separate embodiments of the present invention. If backplane device 208 is implemented in uplink card 202, uplink card 202 communicates with one or more line cards 204a, each having a backplane device 212. Backplane device 212 may utilize a processor 214 in order to implement the invention. Backplane device 212 communicates with DSL modems through DSL modem stations 216. The communication through DSL modem stations allows CPE devices to provide signals for interception by line card 204a, and allows line card 204a to transmit a requested data channel to a requesting CPE device.

If switching fabric 210 is implemented in uplink card 202, uplink card 202 communicates with one or more line cards 204b, each having a universal bridge (UB) 218. Universal bridge 218 utilizes a processor 220 in implementing the invention and communicating with DSL modem stations 216 of line card 204b. DSL modem stations 216, modems and CPE devices perform similar functions in embodiments utilizing line cards 204a and 204b.

Figure 3:
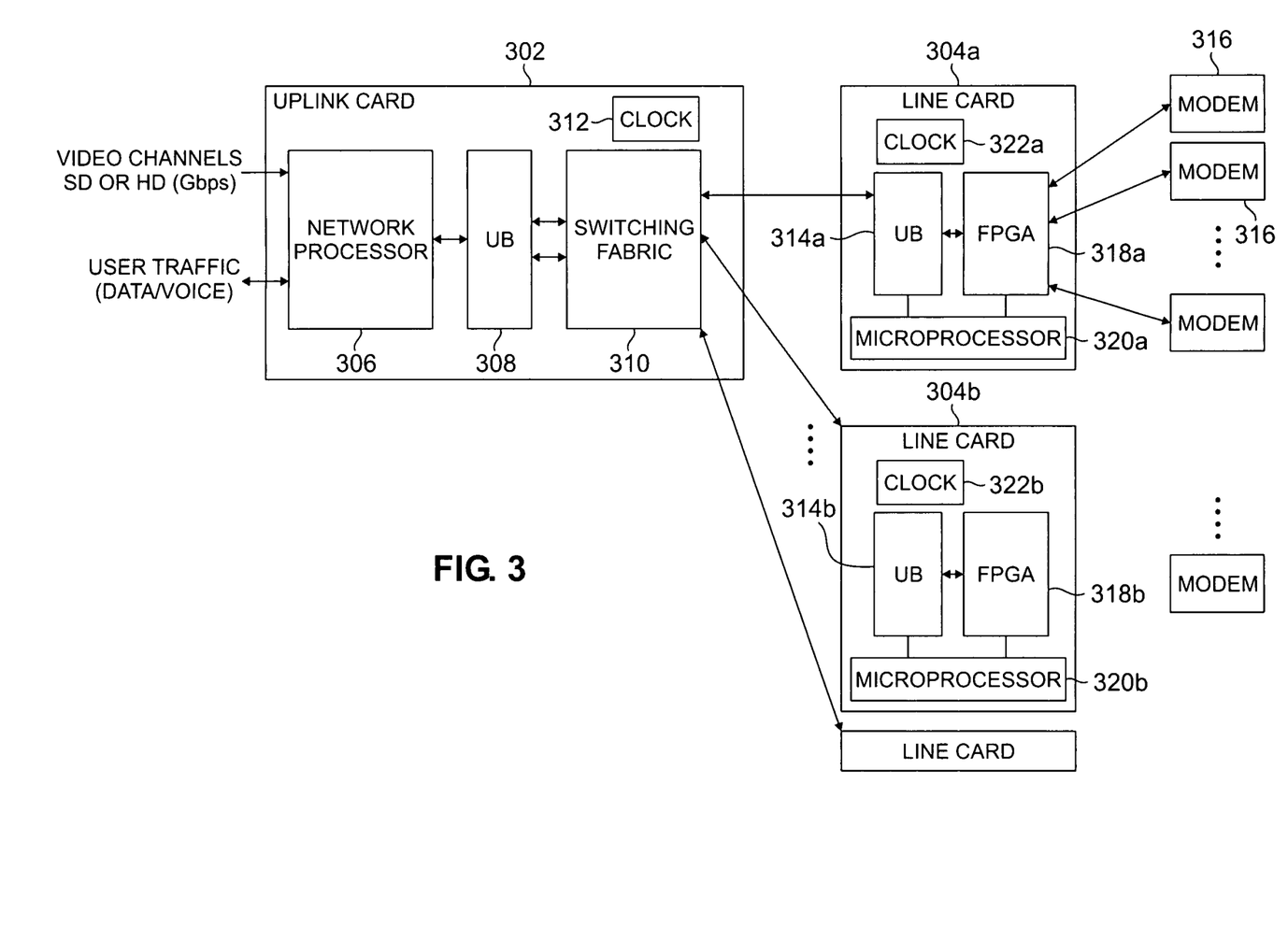
FIG. 3 is a diagram illustrating a more detailed example implementation of the FIG. 2 arrangement, according to an embodiment of the present invention.

As shown in FIG. 3, a diagram illustrates a more detailed example implementation of the FIG. 2 arrangement, according to an embodiment of the present invention. More specifically, this may be considered a detailed description of the general DSLAM central office architecture implementing a switching fabric in an uplink card. An uplink card 302 receives data channels and communicates user traffic through a network processor 306, which corresponds to network processor 206 in FIG. 2. Network processor 306 may be implemented as part APP550, commonly available from Agere Systems Inc., of Allentown, Pa., USA. Network processor 306 is in communication with a UB 308, which communicates with switching fabric 310. In this embodiment of the present invention, UB 308 may be implemented as part UB2G5NP and switching fabric 310 may be implemented as parts PI40SAX, PI20SAX, which are also commonly available from Agere Systems Inc. Uplink card 302 also includes a clock 312. Uplink card 302 transmits channels to one or more line cards 304, while also receiving necessary user traffic.

In line card 304a, a UB 314a communicates with uplink card 302 through switching fabric 310. UB 314a is also in communication with FPGA 318a and microprocessor 320a within line card 304a in order to implement the invention. Line card 304a communicates with modems 316 through FPGA 318a. The channels are transmitted to FPGA 318a from uplink card 302 and a control message is transmitted to FPGA 318a from a modem 316. A similar communication system exists with regard to line card 304b, UB 314b, FPGA 318b, and microprocessor 320b. Both line cards 304a, 304b also include respective clocks 322a, 322b.

Figure 4:
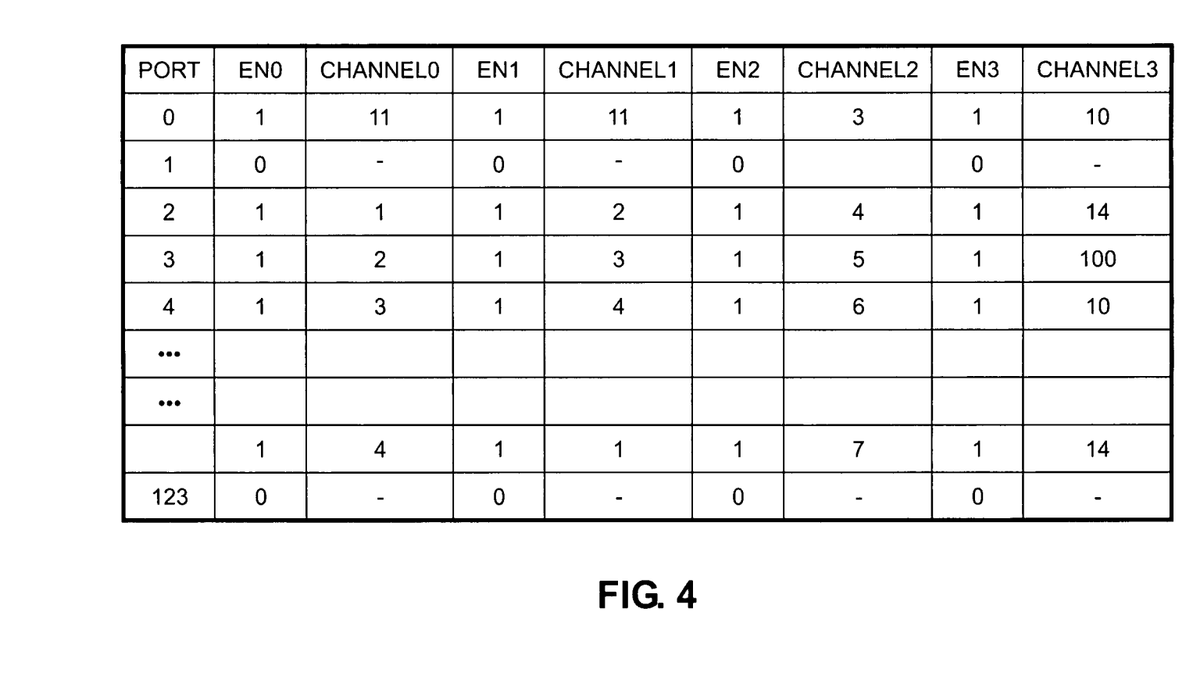
FIG. 4 is a table illustrating channel selection at CPE devices in a DSLAM network, according to an embodiment of the present invention.

FPGA 318a, 318b in communication with processor 320a, 320b may be considered a management device of line card 304a, 304b. Such a management device of the line card may be viewed as one example of an integrated circuit device that implements the present invention. The management device maintains a table, as shown in FIG. 4. The table may be stored in an internal memory of the management device or an associated external memory. The table illustrates the channel selection at CPE devices for a specific line card. This table is used to provide and manage requested data channels for appropriate end users. When an end user at a CPE device switches a channel, the CPE device generates a control message, for example, IGMP, that is intended to be destined to the far-end server, B-RAS. The management device in the line card of the CO intercepts the control message and uses it to dynamically update the table and provide the requested channel to the CPE device. The management device is able to provide the data channel because every data channel is transmitted to the CO and transmitted to the individual line cards that comprise the management device.

The table is updated dynamically, utilizing in this embodiment a one-to-one signaling between the CPE device and the management device. An identification number of the data channel must be obtained from the control message sent from the CPE device. The table maintains the data channel ID, for example, a TV channel number, of the data channel requested by and transmitted to the CPE device. In addition, the table includes an enable/disable bit for each CPE device associated with the line card, to indicate whether it is on or off. The port column in the table represents the DSL modems at each residence or business. The table in FIG. 4 illustrates 124 modems, each capable of supporting 4 CPE devices, for example, 4 set-top channel boxes in each house. Additional embodiments of the management device of the line card may maintain a table having 48 or 64 DSL modems.

Figure 5:
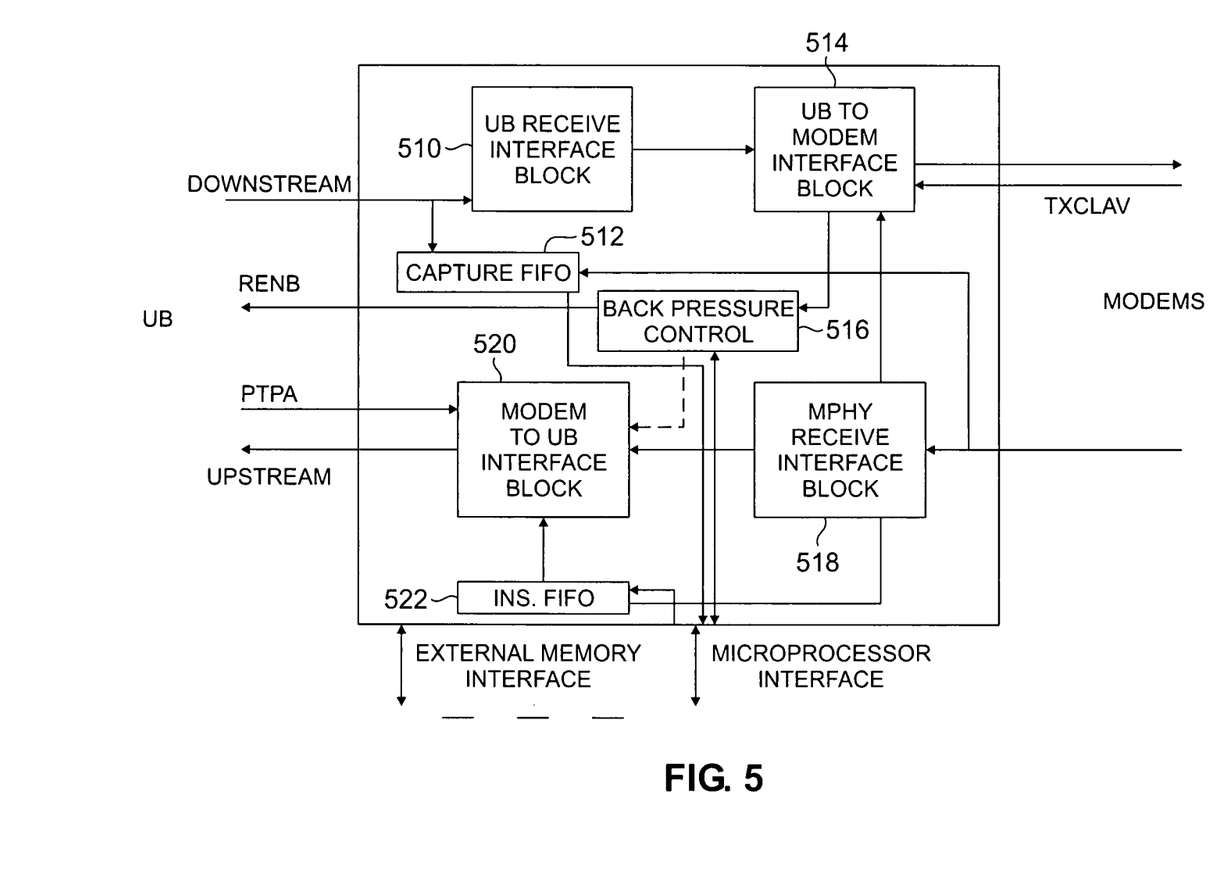
FIG. 5 is a diagram illustrating function blocks of an FPGA device in a DSLAM network, according to an embodiment of the present invention.

Referring now to FIG. 5, a block diagram illustrates functional blocks of an FPGA device, according to an embodiment of the present invention. This may be considered a detailed description of FPGA device 318 in FIG. 3. A downstream signal is received at a UB receive interface block 510 from a UB, which may implemented as part UB2G5, commonly available from Agere Systems Inc. UB receive interface block 510 maintains the table indicating the channel selection at the CPE devices, as well as a cell header translation table if required. Capture FIFO 512, extracts a signal generated from the UB for back pressure control purposes, as will be described below, and transmits to the microprocessor interface. A UB to modem interface block 514 receives transmissions from UB receive interface block 510 and provides transmission of requested channels to requesting CPE devices through modems.

If a modem's receive interface suffers from congestion, the modem should ignore the FPGA device's polling to avoid overflow in the modem. Specifically, when back pressure comes from the modem TXCLAV, the FPGA device should not send traffic to the modem and should maintain individual per port back pressure status. If the FPGA device suffers from congestion, it will generate a flow control message RENB and send it upstream.

A multi physical layer (MPHY) receive interface block 518 receives control messages from the CPE devices through modems. A modem to UB interface block 520 receives a transmission from MPHY receive interface block 518 and generates TM cells for transmission to UB2G5. Insertion FIFO 522 inserts a control message generated from a back pressure control block 516 and from the microprocessor. A polled-PHY transmit packet available (PTPA) is also received at modem to UB interface block 520 from the UB.

Figure 6:
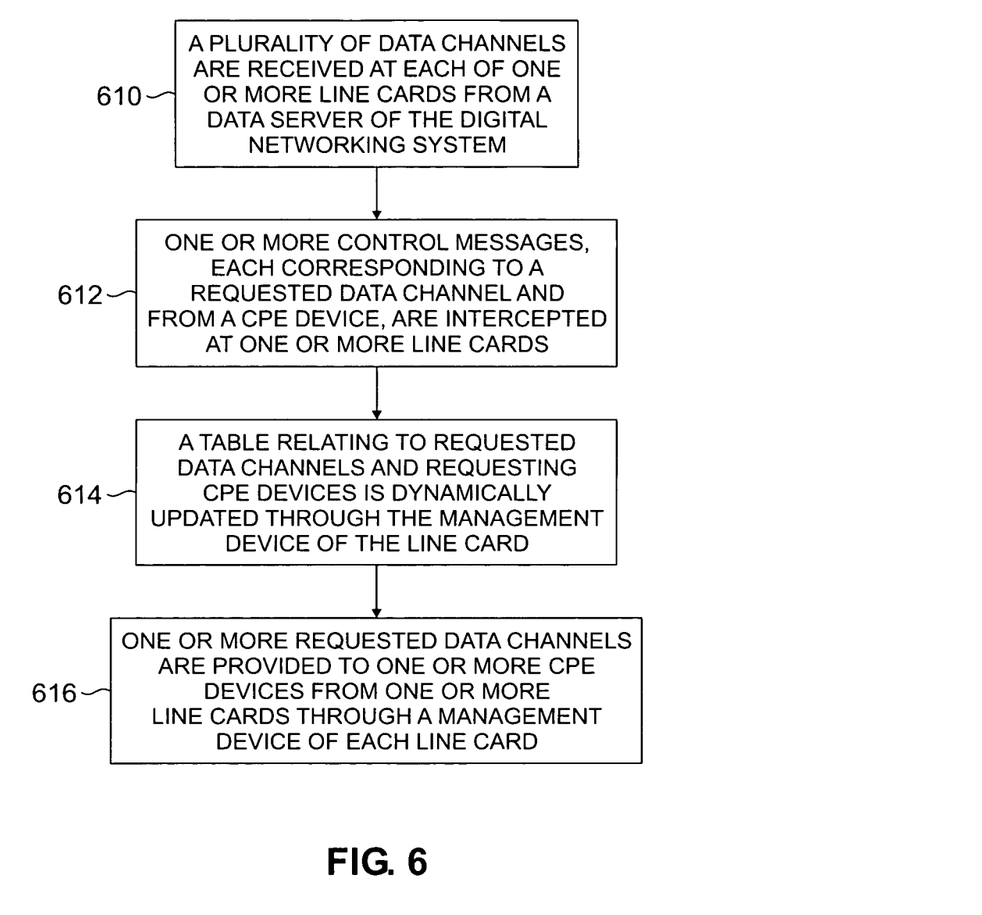
FIG. 6 is a flow diagram illustrating a channel selection or switching methodology in a DSLAM network, according to an embodiment of the present invention.

As shown in FIG. 6, a flow diagram illustrates a channel selection or switching methodology at a line card of a DSLAM network, according to an embodiment of the present invention. The methodology begins in block 610 where a plurality of data channels are received at each of one or more line cards from a data server of the digital networking system. In block 612, one or more control messages, each corresponding to a requested data channel and from a CPE device, are intercepted at one or more line cards. In block 614, a table relating to requested data channels and requesting CPE devices is dynamically updated through the integrated circuit device of the line card. Finally, in block 616, one or more requested data channels are provided to one or more CPE devices from one or more line cards through an integrated circuit device of each line card, terminating the methodology. The methodology may repeat for each control message received at each line card in the DSLAM network.

Accordingly, as described herein, the present invention in the illustrative embodiment provides data channels to end users of a network through an effective data channel selection and switching technique.

Additional embodiments of the present invention may incorporate multiple numbers and combinations of COs, DSL modems and CPE devices. These embodiments may also incorporate different numbers and combinations of line cards associated with a single uplink card in the COs. The tables described above in each line card are based on the number of modems the line card communicates with and the number of CPE devices associated with each modem. Therefore, the number of ports and channels provided in the table may also differ in additional embodiments. In a specific embodiment of the present invention an ASIC device may be utilized in place of the FPGA device. Further, proprietary signaling from another application may be utilized in place of IGMP. The invention may be implemented when any type of control message is used. Finally, the invention is not limited to uplink card-line card configurations in the CO of the illustrative embodiments. The invention may also apply to single hierarchy configurations where only a line card is utilized.

As discussed above, the management device of the present invention may be considered an integrated circuit device. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Therefore, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An integrated circuit device for use in a line card in a network node of a digital networking system, the network node further comprising an uplink card configured for receiving a plurality of data channels from a data server of the digital network system and providing the plurality of data channels to each of a plurality of line cards in the network node, wherein the integrated circuit device in communication with a processor is configured for intercepting one or more control messages from at least one customer premises equipment (CPE) device, the one or more control messages comprising one or more data channel requests that remain in the plurality of line cards without reaching the uplink card, receiving the plurality of data channels from the uplink card in advance of the data channel requests, providing the one or more requested data channels from at least one of the plurality of line cards to the at least one CPE device in response to the one or more control messages, and maintaining a table comprising a currently requested data channel for each of the at least one CPE devices.

2. The integrated circuit device of claim 1, comprising a field programmable gate array device.

3. The integrated circuit device of claim 1, comprising an application-specific integrated circuit (ASIC) device.

4. The integrated circuit device of claim 1, wherein each of the one or more control messages comprises an Internet group multicast protocol signal.

5. The integrated circuit device of claim 1, wherein the table updates dynamically in response to each intercepted control message from the at least one CPE device.

6. The integrated circuit device of claim 5, wherein each of the table updates is synchronous to the intercepted control messages.

7. The integrated circuit device of claim 5, wherein each of the table updates occurs through a one-to-one signaling between each of the at least one CPE devices and integrated circuit device in communication with the processor.

8. The integrated circuit device of claim 1, wherein the integrated circuit device is adapted to be in communication with a backplane device of the line card that is adapted to be in communication with a backplane device of the uplink card.

9. The integrated circuit device of claim 8, wherein the integrated circuit device is adapted to be in communication with the processor that is adapted to be in communication with the backplane device of the line card.

10. The integrated circuit device of claim 1, wherein the integrated circuit device is adapted to be in communication with a universal bridge of the line card that is adapted to be in communication with a switching fabric of the uplink card.

11. The integrated circuit device of claim 10, wherein the integrated circuit device is adapted to be in communication with the processor that is adapted to be in communication with the universal bridge of the line card.

12. The integrated circuit device of claim 1, wherein the integrated circuit device is adapted to be in communication with one or more modem stations for communication with one or more modems in association with the at least one CPE device.

13. The integrated circuit device of claim 1, wherein the table comprises information indicating whether each of the at least one CPE devices is on or off.

14. The integrated circuit device of claim 1, wherein the table comprises the currently requested data channel for each of the at least one CPE devices without channel privilege information of a subscriber.

15. The integrated circuit device of claim 1, wherein the plurality of data channels provided to each of the plurality of line cards comprise every data channel from the data server of the digital network system.

16. An apparatus for use in a network node of a digital networking system, the apparatus comprising an uplink card configured for receiving a plurality of data channels from a data server of the digital networking system and providing the plurality of data channels to each of a plurality of line cards in the apparatus, each of the plurality of line cards comprising an integrated circuit device in communication with a processor configured for intercepting one or more control messages from at least one customer premises equipment (CPE) device, the one or more control messages comprising one or more data channel requests that remain in the plurality of line cards without reaching the uplink card, receiving the plurality of data channels from the uplink card in advance of the data channel requests, providing the one or more requested data channels from at least one of the plurality of line cards to the at least one CPE device in response to the one or more control messages, and maintaining a table comprising a currently requested data channel for each of the at least one CPE devices.

17. The apparatus of claim 16, wherein the uplink card comprises a multi-protocol network processor and a backplane device in communication with the network processor.

18. The apparatus of claim 16, wherein the uplink card comprises a multi-protocol network processor and a switching fabric in communication with the network processor.

19. A digital networking system comprising:
a data server capable of transmitting a plurality of data channels;
at least one customer premises equipment (CPE) device capable of transmitting one or more control messages each comprising one or more data channel requests; and
at least one network node comprising an uplink card configured for receiving a plurality of data channels from a data server of the digital networking system and providing the plurality of data channels to each of a plurality of line cards in the network node, each of the plurality of line cards having an integrated circuit device in communication with a processor configured for intercepting one or more control messages from the at least one CPE device, wherein the one or more data channel requests remain in the plurality of line cards without reaching the uplink card, receiving the plurality of data channels from the uplink card in advance of the data channel requests, providing the one or more requested data channels from at least one of the plurality of line cards to the at least one CPE device in response to the one or more control messages, and maintaining a table comprising a currently requested data channel for each of the at least one CPE devices.

20. A method of providing a data channel to a customer premises equipment (CPE) device in a digital networking system comprising the steps of:
receiving a plurality of data channels at one or more uplink cards of a network node from a data server of the digital networking system;
providing the plurality of data channels to each of a plurality of line cards of the network node from the one or more uplink cards;
intercepting one or more control messages, each comprising one or more data channel requests and from a CPE device, at one or more of the line cards, wherein the one or more data channel requests remain in the plurality of line cards without reaching the one or more uplink cards, and wherein the plurality of data channels are provided to each of the plurality of line cards from the one or more uplink cards in advance of the data channel requests;
providing, in response to the one or more control messages, one or more requested data channels to the one or more CPE devices from at least one of the plurality of line cards through an integrated circuit device of the line card in communication with a processor of the line card; and
maintaining a table comprising a currently requested data channel for each of the one or more CPE devices.

21. The method of claim 20, further comprising the step of:
dynamically updating the table maintained by the integrated circuit device of the line card that relates requested data channels and requesting CPE devices.

22. The method of claim 21, wherein the step of dynamically updating a table comprises the steps of:
determining when one or more CPE devices are enabled; and
tracking one or more data channels requested by one or more enabled CPE devices.

23. The method of claim 20, wherein the integrated circuit device of the line card comprises an field programmable gate array device.

24. The method of claim 20, wherein, in the steps of intercepting one or more control messages and providing one or more requested data channels, the one or more CPE devices communicate with the at least one line card through a modem.

* * * * *